Patented June 29, 1948

2,444,034

UNITED STATES PATENT OFFICE 2,444,034

ELECTRICALLY CONDUCTING ADHESIVE

Norman Hixon Collings and Raymond John Heaphy Beverton, London, England, assignors to Standard Telephones and Cables Limited, London, England No Drawing. Application May 28, 1945, Serial No. 596,408. In Great Britain June 2, 1944

2 Claims. (Cl. 106—193)

This invention relates to an electrically conducting adhesive.

We have found that it is possible to mix with an adhesive sufficient noble metal in the form of a finely divided powder so that when dry the resultant material is electrically conducting while still retaining its adhesive properties.

Such a conducting adhesive finds many applications in the electrical arts and more particularly it enables conducting leads to be connected to delicate apparatus to which the temperature required for soldering would be deleterious.

According to the invention we provide a conducting adhesive, having when dry a specific resistance less than 30 ohm per cm.³ consisting of a homogeneous organic matrix containing at least 20% by volume of a finely divided noble metal evenly dispersed in it.

The conducting adhesive in its initial condition contains an organic solvent enabling its viscosity to be reduced to such a value that it can be applied as desired. Normally this solvent is sufficiently volatile to allow the conducting adhesive to dry at room temperature, but this is not necessarily so.

A preferred form of the conducting adhesive according to the invention consists of finely divided silver evenly dispersed throughout an adhesive. Examples of the manner in which such adhesive may be manufactured is as follows:

Example 1

Finely divided silver is prepared by chemical precipitation. The precipitated silver is washed by decantation, excess water is then squeezed out and the precipitate dried in hot air at a temperature of between 90° and 110° C. for about 24 hours until it is completely dry. The dried silver is then broken up in a disintegrator and is finally mixed with a solution of cellulose nitrate in amyl acetate, with suitable plasticisers until a smooth homogeneous product is obtained. The proportions by weight are 50% silver, 18% amyl acetate and 32% cellulose nitrate plus plasticisers.

Example 2

Finely divided silver is prepared by chemical precipitation from a solution containing a small amount (0.1% to 2.0% by weight), of starch. The starch assists in giving a silver of small particle size within close limits. This silver is treated as in Example 1 and an adhesive prepared as in that example.

Example 3

Finely divided silver prepared as in Example 1 or Example 2 is mixed with cellulose acetate and benzyl alcohol in the following proportions by weight: 36% silver, 23% cellulose acetate, 41% benzyl alcohol. The ingredients are mixed thoroughly and during the mixing the mixture is not allowed to remain stationary for more than a few minutes at a time. After a homogeneous mixture is obtained the conducting adhesive so obtained sets to a jelly like mass on standing thus effectively preventing the settling out of the silver particles during storage whilst returning to a usable consistency when worked vigorously for a short while.

The specific resistance when dry of an adhesive prepared according to any of the above examples is 0.03 ohms per c. c. The tensile strength of each adhesive was 3,000 lbs. per sq. in. A mixture is considered to form an adhesive if its tensile strength when dry is greater than 1,000 lbs. per sq. in.

The specific resistance of adhesives according to the invention but containing other noble metals than silver will, other things being equal, be greater than one containing silver but satisfactory adhesives can be prepared containing such other noble metals and having specific resistances less than 30 ohms per c. c.

The conducting adhesives according to the invention may be used for securing conducting wires for electrodes of interleaved foil and paper electric condensers or for securing conducting wires directly to silvered mica surfaces of electric condensers. It is also useful for securing lead wires to electrodes applied to piezo electric crystals.

What is claimed is:

1. A conductive self-setting adhesive composition for making electrical connections comprising a homogeneous adhesive jelly-like mass consisting of a cellulose ester and benzyl alcohol and having intimately mixed therewith a finely divided noble metal in a proportion such that specific resistance of said composition when set is less than 30 ohms/cm.³.

3. A conductive adhesive composition as claimed in claim 1 comprising by weight 36% finely divided silver, 23% cellulose acetate and 41% benzyl alcohol.

NORMAN HIXON COLLINGS.
RAYMOND JOHN HEAPHY BEVERTON.

(References on following page)

REFERENCES CITED

The following references are of record in the file of this patent:

UNITED STATES PATENTS

| Number | Name | Date |
|---|---|---|
| 2,361,220 | Loftis | Oct. 24, 1944 |
| 2,280,135 | Ward | Apr. 21, 1942 |
| 2,018,343 | Beinfait et al. | Oct. 22, 1935 |
| 1,913,214 | Schuhmann | June 6, 1933 |

OTHER REFERENCES

"The Chemical Formulary"—Bennett, vol. III, page 56—Van Nostrand Company, Inc., New York, 1936.